(12) United States Patent
Yu et al.

(10) Patent No.: US 8,265,128 B2
(45) Date of Patent: Sep. 11, 2012

(54) MULTIPLE-INPUT MULTIPLE-OUTPUT (MIMO) WITH RELAY NODES

(75) Inventors: Yi Yu, Irving, TX (US); James Earl Womack, Bedford, TX (US); Zhijun Cai, Euless, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 701 days.

(21) Appl. No.: 12/340,432

(22) Filed: Dec. 19, 2008

(65) Prior Publication Data
US 2010/0158142 A1    Jun. 24, 2010

(51) Int. Cl.
*H04B 3/36* (2006.01)

(52) U.S. Cl. ............ 375/211; 375/214; 370/315; 455/7; 455/13.3; 455/15; 455/24; 455/25

(58) Field of Classification Search .................. 375/295, 375/260, 267, 211, 214; 370/315; 455/550.1, 455/452.2, 7, 11.1, 13.3, 15, 24–25, 450.1
See application file for complete search history.

(56) References Cited

U.S. PATENT DOCUMENTS

| | | | |
|---|---|---|---|
| 6,014,375 A | 1/2000 | Janky | |
| 6,512,745 B1 | 1/2003 | Abe et al. | |
| 6,690,657 B1 | 2/2004 | Lau et al. | |
| 6,785,510 B2 | 8/2004 | Larsen | |
| 7,054,633 B2 | 5/2006 | Seo et al. | |
| 7,061,879 B2 | 6/2006 | Oprescu-Surcobe et al. | |
| 7,130,614 B2 | 10/2006 | Sreemanthula et al. | |
| 7,227,851 B1 | 6/2007 | Gopalakrishnan et al. | |
| 7,349,665 B1 | 3/2008 | Zhu et al. | |
| 7,386,036 B2 | 6/2008 | Pasanen et al. | |
| 7,564,827 B2 | 7/2009 | Das et al. | |
| 7,602,843 B2 | 10/2009 | Cho et al. | |
| 7,673,211 B2 | 3/2010 | Meyer et al. | |
| 7,706,408 B2 | 4/2010 | Takagi et al. | |
| 7,724,767 B2 | 5/2010 | Oksman | |
| 7,742,448 B2 | 6/2010 | Ramachandran et al. | |

(Continued)

FOREIGN PATENT DOCUMENTS

EP    1534035 A1    5/2005

(Continued)

OTHER PUBLICATIONS

Cai, Zhijun, et al.; U.S. Appl. No. 12/916,214, filed Oct. 29, 2010; Title: System and Method for Autonomous Combining.

(Continued)

*Primary Examiner* — Sam K Ahn
*Assistant Examiner* — Sophia Vlahos
(74) *Attorney, Agent, or Firm* — Conley Rose, P.C.; J. Robert Brown, Jr.

(57) ABSTRACT

A method for providing multiple-input multiple-output (MIMO) feedback information and configuration information. The method includes transporting the MIMO feedback information, configuration information, or both over an uplink relay link using higher layer signaling. Also included is a method for providing uplink data transmission over an access link. The method includes transporting the uplink data over an uplink access link using orthogonal frequency-division multiplexing access (OFDMA). Also included is a relay node comprising a processor configured to promote transmitting MIMO feedback information, configuration information, or both over an uplink relay link using higher layer signaling. Also included is a user agent (UA) comprising a processor configured to promote transmitting uplink data over an uplink access link using OFDMA.

22 Claims, 4 Drawing Sheets

U.S. PATENT DOCUMENTS

| | | | |
|---|---|---|---|
| 7,830,837 B2 | 11/2010 | Park et al. | |
| 7,873,002 B2 | 1/2011 | Cai | |
| 7,898,948 B2* | 3/2011 | DiGirolamo et al. | 370/230 |
| 8,121,552 B2 | 2/2012 | Agami et al. | |
| 2002/0155839 A1 | 10/2002 | Nisbet | |
| 2002/0187746 A1 | 12/2002 | Cheng et al. | |
| 2003/0096631 A1 | 5/2003 | Kayama et al. | |
| 2004/0042492 A1 | 3/2004 | Suzuki et al. | |
| 2004/0063451 A1 | 4/2004 | Bonta et al. | |
| 2005/0042987 A1 | 2/2005 | Lee et al. | |
| 2005/0232212 A1 | 10/2005 | Kang et al. | |
| 2006/0183421 A1* | 8/2006 | Proctor et al. | 455/11.1 |
| 2007/0104148 A1 | 5/2007 | Kang et al. | |
| 2007/0153734 A1 | 7/2007 | Lee et al. | |
| 2007/0155315 A1* | 7/2007 | Lee et al. | 455/11.1 |
| 2007/0171925 A1 | 7/2007 | Tanimoto | |
| 2007/0206531 A1 | 9/2007 | Pajukoski et al. | |
| 2007/0253421 A1 | 11/2007 | Cai | |
| 2008/0002610 A1 | 1/2008 | Zheng et al. | |
| 2008/0025323 A1 | 1/2008 | Khan | |
| 2008/0043671 A1 | 2/2008 | Moon et al. | |
| 2008/0043710 A1 | 2/2008 | Zhou et al. | |
| 2008/0081628 A1 | 4/2008 | Ye et al. | |
| 2008/0089282 A1 | 4/2008 | Malladi et al. | |
| 2008/0107076 A1 | 5/2008 | Ramachandran et al. | |
| 2008/0165776 A1 | 7/2008 | Tao et al. | |
| 2008/0212513 A1 | 9/2008 | Tao et al. | |
| 2008/0225765 A1 | 9/2008 | Marinier et al. | |
| 2008/0225772 A1* | 9/2008 | Xu | 370/313 |
| 2008/0227461 A1* | 9/2008 | Dayal et al. | 455/452.2 |
| 2008/0232284 A1 | 9/2008 | Dalsgaard et al. | |
| 2008/0232493 A1 | 9/2008 | Zhang et al. | |
| 2008/0247375 A1 | 10/2008 | Muharemovic et al. | |
| 2008/0285500 A1 | 11/2008 | Zhang et al. | |
| 2008/0285501 A1 | 11/2008 | Zhang et al. | |
| 2008/0293358 A1 | 11/2008 | Andersson et al. | |
| 2008/0310389 A1 | 12/2008 | Suzuki et al. | |
| 2009/0046641 A1 | 2/2009 | Wang et al. | |
| 2009/0061892 A1 | 3/2009 | Lee et al. | |
| 2009/0111476 A1 | 4/2009 | Hamalainen et al. | |
| 2009/0154533 A1 | 6/2009 | Khayrallah et al. | |
| 2009/0190522 A1 | 7/2009 | Horn et al. | |
| 2009/0191882 A1 | 7/2009 | Kovacs et al. | |
| 2009/0196332 A1 | 8/2009 | Miyatani | |
| 2009/0239568 A1 | 9/2009 | Bertrand et al. | |
| 2009/0252079 A1 | 10/2009 | Zhang et al. | |
| 2009/0264077 A1 | 10/2009 | Damnjanovic | |
| 2009/0276672 A1 | 11/2009 | Lee et al. | |
| 2009/0291679 A1 | 11/2009 | Wu | |
| 2009/0303918 A1* | 12/2009 | Ma et al. | 370/315 |
| 2010/0027457 A1 | 2/2010 | Okuda | |
| 2010/0027458 A1 | 2/2010 | Wu et al. | |
| 2010/0039947 A1 | 2/2010 | Li et al. | |
| 2010/0046413 A1 | 2/2010 | Jin et al. | |
| 2010/0056197 A1 | 3/2010 | Attar et al. | |
| 2010/0061361 A1 | 3/2010 | Wu | |
| 2010/0074209 A1 | 3/2010 | Montojo et al. | |
| 2010/0091759 A1 | 4/2010 | Stahl et al. | |
| 2010/0103845 A1 | 4/2010 | Ulupinar et al. | |
| 2010/0120442 A1 | 5/2010 | Zhuang et al. | |
| 2010/0131814 A1 | 5/2010 | Chiu | |
| 2010/0135251 A1 | 6/2010 | Sambhwani et al. | |
| 2010/0142433 A1 | 6/2010 | Womack et al. | |
| 2010/0182992 A1 | 7/2010 | Chun et al. | |
| 2010/0302998 A1 | 12/2010 | Bao et al. | |
| 2011/0026409 A1 | 2/2011 | Hu et al. | |
| 2011/0041027 A1 | 2/2011 | Fong et al. | |
| 2011/0261763 A1 | 10/2011 | Chun et al. | |

FOREIGN PATENT DOCUMENTS

| | | |
|---|---|---|
| EP | 1773091 A2 | 4/2007 |
| EP | 1775983 A1 | 4/2007 |
| EP | 1883178 A2 | 1/2008 |
| EP | 1890402 A2 | 2/2008 |
| EP | 1919234 A2 | 5/2008 |
| EP | 1940185 A1 | 7/2008 |
| EP | 1959708 A1 | 8/2008 |
| EP | 1995921 A2 | 11/2008 |
| WO | 0137590 A1 | 5/2001 |
| WO | 2005064872 A1 | 7/2005 |
| WO | 2006024321 A1 | 3/2006 |
| WO | 2007048247 A1 | 5/2007 |
| WO | 2007053950 A1 | 5/2007 |
| WO | 2007053954 A1 | 5/2007 |
| WO | 2007073121 A1 | 6/2007 |
| WO | 2007131347 A1 | 11/2007 |
| WO | 2008004806 A1 | 1/2008 |
| WO | 2008009228 A1 | 1/2008 |
| WO | 2008022132 A2 | 2/2008 |
| WO | 2008084949 A1 | 7/2008 |
| WO | 2008103981 A2 | 8/2008 |
| WO | 2008109912 A1 | 9/2008 |
| WO | 2008115826 A1 | 9/2008 |
| WO | 2009088172 A2 | 7/2009 |

OTHER PUBLICATIONS

Office Action dated Jul. 12, 2010, 40 pages, U.S. Appl. No. 12/337,207, filed Dec. 17, 2008.

Notice of Allowance dated Nov. 8, 2010, 10 pages, U.S. Appl. No. 12/337,214, filed Dec. 17, 2008.

Office Action dated Aug. 17, 2010, 25 pages, U.S. Appl. No. 12/337,222, filed Dec. 17, 2008.

PCT International Preliminary Report on Patentability; PCT Application No. PCT/US2009/062571; Mar. 10, 2011; 8 pgs.

Office Action dated Jan. 25, 2011, 39 pages, U.S. Appl. No. 12/337,207, filed Dec. 17, 2008.

Notice of Allowance dated Mar. 25, 2011, 11 pages, U.S. Appl. No. 12/337,214, filed Dec. 17, 2008.

Final Office Action dated Jan. 14, 2011, 16 pages, U.S. Appl. No. 12/337,222, filed Dec. 17, 2008.

3GPP TS 36.321 v8.1.0; 3rd Generation Partnership Project; Technical Specification Group Radio Access Network; Evolved Universal Terrestrial Radio Access (E-UTRA) Medium Access Control (MAC) Protocol Specification; Release 8; Mar. 2008; 30 pgs.

Panasonic; 3GPP TSG RAN WG1 Meeting #54; Title: Discussion on the Various Types of Relays; R1-082397; Warsaw, Poland; Jun. 30-Jul. 4, 2008; 6 pgs.

Research in Motion, Limited; 3GPP TSG RAN WG1 Meeting #55; Title: L2 Relay Interference Mitigation; R1-084102; Prague, Czech Republic; Nov. 10-14, 2008; 6 pgs.

Research in Motion, Limited; 3GPP TSG RAN WG1 Meeting #55-bis; Title: Relay Control Signalling Resource Coordination; R1-090027; Ljubljana, Slovenia; Jan. 12-16, 2009; 3 pgs.

PCT International Search Report; PCT Application No. PCT/US2009/062551; Jan. 28, 2010; 4 pgs.

PCT Written Opinion of the International Searching Authority; PCT Application No. PCT/US2009/062551; Jan. 28, 2010; 5 pgs.

PCT Communication Relating to the Results of the Partial International Search; PCT Application No. PCT/US2009/062554; Mar. 2, 2010; 7 pgs.

PCT International Search Report; PCT Application No. PCT/US2009/062557; Feb. 10, 2010; 4 pgs.

PCT Written Opinion of the International Searching Authority; PCT Application No. PCT/US2009/062557; Feb. 10, 2010; 7 pgs.

PCT International Search Report; PCT Application No. PCT/US2009/062560; Mar. 1, 2010; 4 pgs.

PCT Written Opinion of the International Searching Authority; PCT Application No. PCT/US2009/062560; Mar. 1, 2010; 7 pgs.

PCT International Search Report; PCT Application No. PCT/US2009/062570; Feb. 22, 2010; 4 pgs.

PCT Written Opinion of the International Searching Authority; PCT Application No. PCT/US2009/062570; Feb. 22, 2010; 8 pgs.

PCT Communication Relating to the Results of the Partial International Search; PCT Application No. PCT/US2009/062571; Feb. 12, 2010; 6 pgs.

PCT International Search Report; PCT Application No. PCT/US2009/064398; Mar. 18, 2010; 5 pgs.

PCT Written Opinion of the International Searching Authority; PCT Application No. PCT/US2009/064398; Mar. 18, 2010; 9 pgs.

Parkvall, Stefan, et al., The Evolution of WCDMA Towards Higher Speed Downlink Packet Data Access, XP-001082550, IEEE VTC, 2001, pp. 2287-2291.
Doppler, Klaus, et al., Assesment of Relay Based Deployment Concepts and Detailed Description of Multi-hop Capable RAN Protocols as Input for the Concept Group Work; IST-4-027756 Winner II; D3.5.2 v1.0; XP-002526747; 24 pages.
PCT International Search Report; PCT Application No. PCT/US2009/062574; Jul. 19, 2010; 6 pgs.
PCT Written Opinion of the International Searching Authority; PCT Application No. PCT/US2009/062574; Jul. 19, 2010; 9 pgs.
Cai, Zhijun, et al.; U.S. Appl. No. 13/221,584, filed Aug. 30, 2011; Title: System and Method for Autonomous Combining.
Office Action dated Aug. 19, 2011; U.S. Appl. No. 12/331,992, filed Dec. 10, 2008; 52 pgs.
Office Action dated Jul. 21, 2011; U.S. Appl. No. 12/340,418, filed Dec. 19, 2008; 34 pgs.
Office Action dated Jun. 16, 2011; U.S. Appl. No. 12/340,412, filed Dec. 19, 2008; 33 pgs.
Office Action dated Jul. 13, 2011; U.S. Appl. No. 12/337,207, filed Dec. 17, 2008; 34 pgs.
Office Action dated Jul. 22, 2011; U.S. Appl. No. 12/337,235, filed Dec. 17, 2008; 36 pgs.
Notice of Allowance dated May 27, 2011; U.S. Appl. No. 12/337,214, filed Dec. 17, 2008; 10 pgs.
Office Action dated Jun. 1, 2011; U.S. Appl. No. 12/337,222, filed Dec. 17, 2008; 2 pgs.
PCT International Preliminary Report on Patentability; PCT Application No. PCT/US2009/030967; Jun. 14, 2011; 11 pgs.
Australian Examination Report; Application No. 2009325082; Jul. 11, 2011; 2 pgs.
PCT International Preliminary Report on Patentability; PCT Application No. PCT/US2009/062551; Jun. 21, 2011; 6 pgs.
PCT International Preliminary Report on Patentability; PCT Application No. PCT/US2009/062554; Jun. 21, 2011; 8 pgs.
PCT International Preliminary Report on Patentability; PCT Application No. PCT/US2009/062557; Jun. 21, 2011; 7 pgs.
PCT International Preliminary Report on Patentability; PCT Application No. PCT/US2009/062560; Jun. 21, 2011; 8 pgs.
PCT International Preliminary Report on Patentability; PCT Application No. PCT/US2009/062570; Jun. 21, 2011; 9 pgs.
PCT International Preliminary Report on Patentability; PCT Application No. PCT/US2009/062574; Jun. 21, 2011; 10 pgs.
PCT International Preliminary Report on Patentability; PCT Application No. PCT/US2009/064398; Jun. 21, 2011; 10 pgs.
Cai, Zhijun, et al.; U.S. Appl. No. 13/221,583, filed Aug. 30, 2011; Title: System and Method for Autonomous Combining.
Rohde & Schwarz; "UMTS Long Term Evolution (LTE) Technology Introduction;" Application Note 1MA111; Sep. 2008; 55 pages.
Yu, Yi, et al.; U.S. Appl. No. 13/216,819, filed Aug. 24, 2011; Title: Multiple-Input Multiple-Output (MIMO) with Relay Nodes.
Final Office Action dated Dec. 9, 2011; U.S. Appl. No. 12/331,992, filed Dec. 10, 2008; 24 pgs.
Office Action dated Nov. 8, 2011; U.S. Appl. No. 121340,412, filed Dec. 19, 2008; 19 pgs.
Office Action dated Nov. 10, 2011; U.S. Appl. No. 13/216,819, filed Aug. 25, 2011; 19 pgs.
Final Office Action dated Jan. 5, 2012; U.S. Appl. No. 12/340,418, filed Dec. 19, 2008; 22 pgs.
Office Action dated Feb. 17, 2012; U.S. Appl. No. 12/340,412, filed Dec. 19, 2008; 19 pgs.
Final Office Action dated Dec. 16, 2011; U.S. Appl. No. 12/337,207, filed Dec. 17, 2008; 37 pgs.
Advisory Action dated Mar. 2, 2012; U.S. Appl. No. 12/337,207, filed Dec. 17, 2008; 3 pages.
Final Office Action dated Jan. 9, 2012; U.S. Appl. No. 12/337,235, filed Dec. 17, 2008; 26 pgs.
Office Action dated Feb. 1, 2012; U.S. Appl. No. 12/337,222, filed Dec. 17, 2008; 20 pgs.
Australian Office Action; Application No. 2009333788; Dec. 8, 2011; 3 pages.
Doppler, Klaus, et al., Assesment of Relay Based Deployment Concepts and Detailed Description of Multi-hop Capable RAN Protocols as Input for the Concept Group Work; IST-4-027756 Winner II; D3.52 v1.0; XP-002526747; 24 pages, Jun. 2007.
PCT International Search Report; PCT Application No. PCT/US2009/062554; May 12, 2010; 6 pgs.
PCT Written Opinion of the International Searching Authority; PCT Application No. PCT/US2009/062554; May 12, 2010; 7 pgs.
PCT International Search Report; PCT Application No. PCT/US2009/062571; Apr. 19, 2010; 6 pgs.
PCT Written Opinion of the International Searching Authority; PCT Application No. PCT/US2009/062571; Apr. 19, 2010; 6 pgs.
PCT Communication Invitation to Pay Additional Fees and, Where Applicable, Protest Fee; PCT Application No. PCT/US2009/062574; Apr. 22, 2010; 8 pgs.
Office Action dated May 26, 2010, 20 pages, U.S. Appl. No. 12/337,214, filed Dec. 17, 2008.
Womack, James Earl, et al.; U.S. Appl. No. 12/331,992, filed Dec. 10, 2008; Title: Method and Apparatus for Discovery of Relay Nodes.
Womack, James Earl, et al.; U.S. Appl. No. 12/340,418, filed Dec. 19, 2008; Title: System and Method for Relay Node Selection.
Yu, Yi, et al.; U.S. Appl. No. 12/337,229, filed Dec. 17, 2008; Title: System and Method for Hybrid Automatic Repeat Request (HARQ) Functionality in a Relay Node.
Cai, Zhijun, et al.; U.S. Appl. No. 12/340,412, filed Dec. 19, 2008; Title: System and Method for Resource Allocation.
Yu, Yi, et al.; U.S. Appl. No. 12/337,207, filed Dec. 17, 2008; Title: System and Method for Multi-User Multiplexing.
Womack, James Earl, et al.; U.S. Appl. No. 12/337,235, filed Dec. 17, 2008; Title: System and Method for Initial Access to Relays.
Cai, Zhijun, et al.; U.S. Appl. No. 12/337,214, filed Dec. 17, 2008; Title: System and Method for Autonomous Combining.
Cai, Zhijun, et al.; U.S. Appl. No. 12/337,222, filed Dec. 17, 2008; Title: System and Method for a Relay Protocol Stack.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 117 pgs.; Part 1.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 101 pgs.; Part 2.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 96 pgs.; Part 3.
PCT International Search Report; PCT Application No. PCT/US2009/030967; Sep. 8, 2009; 5 pgs.
PCT Written Opinion of the International Searching Authority; PCT Application No. PCT/US2009/030967; Sep. 8, 2009; 9 pgs.
3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.
Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pgs.
Texas Instruments; 3GPP TSG RAN WG1 #54bis; Title: Decod and Forward Relays for E-UTRA Enhancements; R1-083533; Prague, Czech Republic; Sep. 29-Oct. 3, 2008; 5 pgs.
3GPP TS 36.331 v8.3.0; 3rd Generation Partnership Project; Technical Specification Group Radio Access Network; Evolved Universal Terrestrial Radio Access (E-UTRA) Radio Resource Control (RRC); Protocol Specification; Release 8; Sep. 2008; 178 pgs.
3GPP TS 36.212 v8.4.0; 3rd Generation Partnership Project; Technical Specification Group Radio Access Network; Evolved Universal Terrestrial Radio Access (E-UTRA); Multiplexing and Channel Coding; Release 8; Sep. 2008; 56 pgs.
3GPP TS 36.304 v8.3.0; 3rd Generation Partnership Project; Technical Specification Group Radio Access Network; Evolved Universal Terrestrial Radio Access (E-UTRA); User Equipment (UE) Procedures in Idle Mode; Release 8; 28 pgs, Sep. 2008.
3GPP TS 36.321 v8.3.0; 3rd Generation Partnership Porject; Technical Specification Group Radio Access Network; Evolved Universal Terrestrial Radio Access (E-UTRA) Medium Access Control (MAC) Protocol Specification; Release 8; Sep. 2008; 36 pgs.

QUALCOMM Europe; 3GPP TSG-RAN WG1 #54; Title: Operation of Relays in LTE-A; R1-083191; Jeju, S. Korea; Aug. 18-22, 2008; 5 pgs.

Mitsubishi Electric; 3GPP TSG RAN WG12#54 Meeting; Title: Basic Structure of Relaying under Multi-Antenna eNB; R1-082775; Jeju Island, Korea; Aug. 18-22, 2008; 4 pgs.

China Mobile, Vodafone, Huawei; TSG-RAN WG1 #54; Title: Application Scenarios for LTE-Advanced Relay; R1-082975; Jeju, Korea; Aug. 18-22, 2008; 7 pgs.

Motorola; TSG-RAN WG1 #54; Title: Classification of Relays; R1-083223; Jeju, South Korea; Aug. 18-22, 2008; 3 pgs.

Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pgs.

Ericsson; TSG-RAN WG1 #53; Title: A Discussion on Some Technology Components for LTE-Advanced; R1-082024; Kansas City, Missouri; May 5-9, 2008; 11 pgs.

3GPP TR 36.913 v1.0.0; 3rd Generation Partnership Project; Technical Specification Group Radio Access Network; Requirements for Further Advancements for E-UTRA (LTE-Advanced); Release 8; May 2008; 13 pgs.

Soldani, David et al.; Title: Wireless Relays for Broadband Access; IEEE Communications Magazine; Mar. 2008; pp. 58-66.

Pabst, Ralf et al.; Title: Relay-Based Deployment Concepts for Wireless and Mobile Broadband Radio; IEEE Communications Magazine; Sep. 2004; pp. 80-89.

Office Action dated Mar. 21, 2012; U.S. Appl. No. 12/337,229, filed Dec. 17, 2008; 49 pages.

Notice of Allowance dated Jun. 12, 2012; U.S. Appl. No. 12/337,207, filed Dec. 17, 2008; 20 pages.

Advisory Action dated Mar. 22, 2012; U.S. Appl. No. 12/337,235, filed Dec. 17, 2008; 10 pages.

Final Office Action dated Apr. 19, 2012; U.S. Appl. No. 13/216,819, filed Aug. 25, 2011; 39 pgs.

Final Office Action dated Jun. 7, 2012; U.S. Appl. No. 12/337,222, filed Dec. 17, 2008; 16 pgs.

Australian Examination Report; Application No. 200325082; Mar. 28, 2012; 3 pages.

European Examination Report; Application No. 09748915.7; May 14, 2012; 3 pages.

European Examination Report; Application No. 09761065.3; May 7, 2012; 4 pages.

* cited by examiner

MULTIPLE-INPUT MULTIPLE-OUTPUT (MIMO) WITH RELAY NODES

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access device" may be used interchangeably, but it is understood that an access node may comprise a plurality of hardware and software.

The term "access node" does not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node to access other components in a wireless communications system. Additionally, two or more relay nodes may used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In wireless communication networks, such as LTE, Multiple-Input Multiple-Output (MIMO) techniques may be used to establish downlinks between the network nodes and the UAs and to improve or increase the system capacity. For instance, using the MIMO techniques multiple data streams can be transported at about the same time, at about the same frequency, or both. Some close-loop MIMO techniques, including beamforming and spatial multiplexing, require feedback information, such as a preceding matrix indicator (PMI), rank indication (RI), and channel quality indicator (CQI), and other configuration information. Such MIMO related information may be transported over the links between the network components. In the presence of stationary or fixed relay nodes in the network, the access node may exchange the MIMO related information more efficiently with the fixed relay nodes in comparison to mobile relay nodes or roaming UAs. However, the close-loop MIMO information can be substantially large and lower layer signaling, such as layer 1 signaling, may not be efficient for transporting such information over the relay link.

Disclosed herein is a system and method for transporting MIMO feedback information, as well as other configuration information using a relay link between a relay node and an access node. Specifically, the feedback and configuration information may be transported via an uplink over the relay link using higher layer signaling. As such, the feedback information may be transported with higher accuracy, upon demand, and at higher modulation levels or rates.

The wireless communication networks may also use other techniques, such as Orthogonal Frequency-Division Multiplexing (OFDM) techniques, to establish downlinks between the network nodes and the UAs. In OFDM, data is divided over a plurality of subcarriers or resources and modulated at lower rates to improve communications and resource allocation. In current networks, single carrier based techniques are used instead of OFDM to establish uplinks between the UAs and the network nodes. However, in the presence of relay nodes in the network, radio conditions between the relay nodes and the UAs may be suitable for using OFDM for the uplinks. For instance, the distances between the relay nodes and the UAs may be relatively small in comparison to the distances between the access nodes and the UAs and can promote higher signal-to-interference ratios (SINRs), which can be suitable for using OFDM to establish uplinks over the access links between the UAs and the relay nodes.

Also disclosed is a system and method for transporting communications data using an access link between the relay link and a UA. Specifically, the uplink data may be transported via an uplink over the access link using OFDM access (OFDMA), which may provide discontinuous resource allocation and increased efficiency. To support the OFDMA discontinuous resource allocation, a bitmap of the assigned resource blocks (RBs) for the uplink grant, or a bitmap of the assigned sets of continuous RBs, may be transported over a physical downlink control channel (PDCCH). Alternatively, the first RB and the last RB for each set of continuous RBs may be transported over the PDCCH. In other embodiments, the PDCCH downlink control information (DCI) formats 1, 1A, 2, or 2A, specified in the 3GPP TS 36.212, may be used instead to signal the uplink grant.

Figure 1:
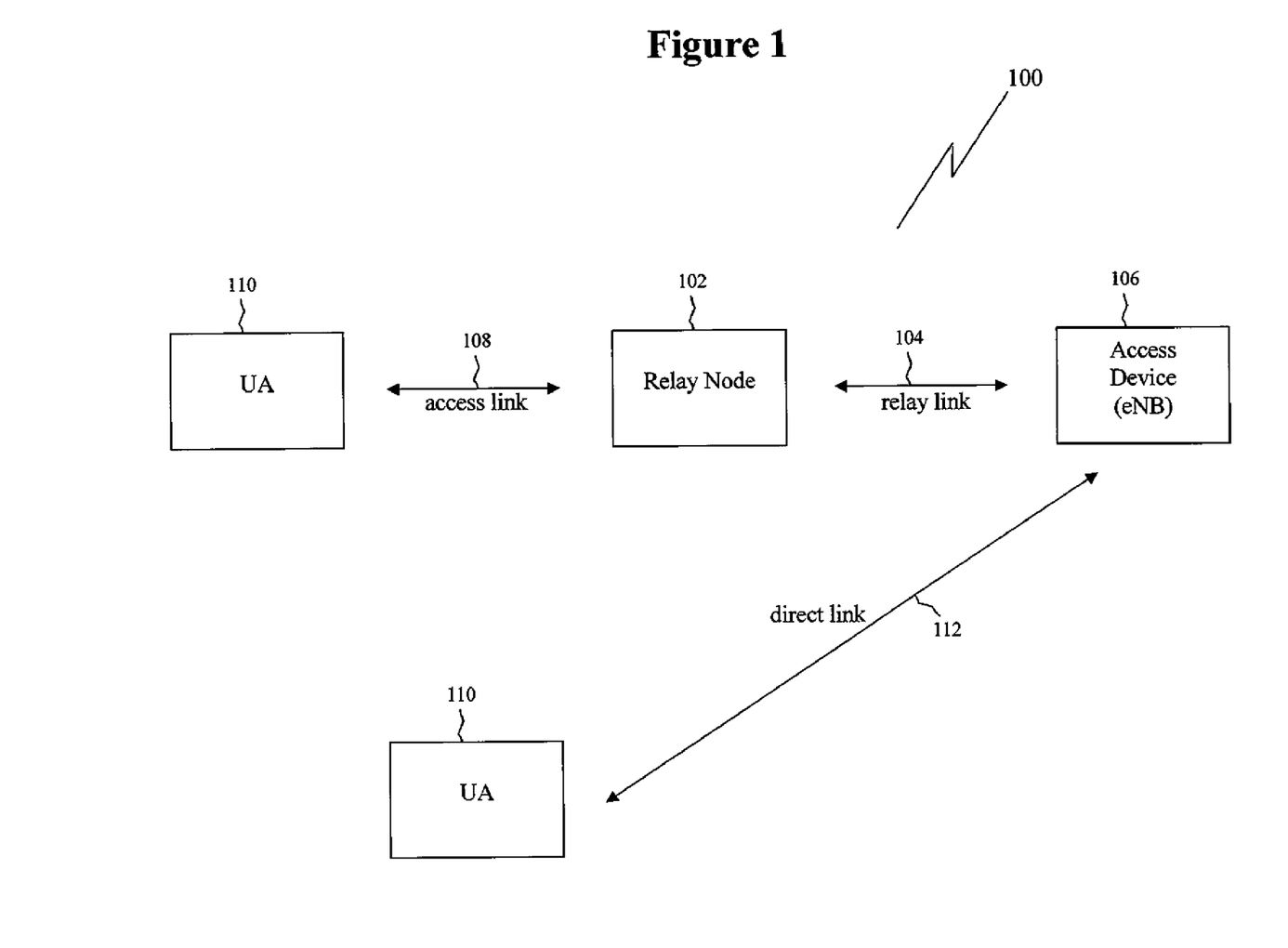
FIG. 1 is a diagram illustrating a wireless communication system using a relay node, according to an embodiment of the disclosure.

FIG. 1 is a diagram illustrating a wireless communication system 100 using a relay node 102, according to an embodiment of the disclosure. Generally, the present disclosure relates to the use of relay nodes in wireless communications networks. Examples of wireless communication networks include LTE or LTE-Advanced (LTE-A) networks, and all of the disclosed and claimed embodiments could be implemented in an LTE-A network. The relay node 102 can amplify or repeat a signal received from a UA 110 and cause the modified signal to be received at an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110. The relay node 102 might be placed near the edges of a cell so that the UA 110 can communicate with the relay node 102 rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within or near a cell, or to extend the size of coverage of a cell. Additionally, the use of a relay node 102 can enhance throughput of a signal within a cell because the UA 110 can access the relay node 102 at a higher data rate or a lower power transmission than the UA 110 might use when communicating directly with the access node 106 for that cell. Transmission at a higher data rate creates higher spectrum efficiency, and lower power benefits the UA 110 by consuming less battery power.

Relay nodes, generally, can be divided into three types: layer one relay nodes, layer two relay nodes, and layer three relay nodes. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node is distinguished from an access node by the fact that it requires the presence of at least one access node (and the cell associated with that access node) to access other components in a telecommunications system. The illustrative embodiments are primarily concerned with layer two or layer three relay nodes. Therefore, as used herein, the term "relay node" will not refer to layer one relay nodes, unless specifically stated otherwise.

In communication system 100, the links that allow wireless communication can be said to be of three distinct types. First, when the UA 110 is communicating with the access node 106 via the relay node 102, the communication link between the UA 110 and the relay node 102 is said to occur over an access link 108. Second, the communication between the relay node 102 and the access node 106 is said to occur over a relay link 104. Third, communication that passes directly between the UA 110 and the access node 106 without passing through the relay node 102 is said to occur over a direct link 112. The terms "access link," "relay link," and "direct link" are used in this document according to the meaning described by FIG. 1.

In an embodiment, the relay node 102 may provide the MIMO feedback information, configuration information, or both to the access node 106 via the relay link 104. Specifically, the relay node 102 may establish an uplink with the access node 106 using higher layer signaling, which may be a non-physical layer (non-PHY) signaling, such as RRC signaling, layer 12 signaling, layer 3 signaling, or Medium Access Control (MAC) based signaling. For example, the PMI, RI, CQI, or combinations thereof may be forwarded using the higher layer signaling between the relay node 102 and the access node 106. In some embodiments, the relay node 102 and the access node 106 are not mobile. As such, the channel between the relay node 102 and the access node 106 is relatively stable or slowly varying. Typically, the MIMO feedback information may not be required frequently on the relay link, and hence the higher layer signaling may be used to forward such information when necessary or upon demand. Further, using higher layer signaling may reduce the amount of allocated resources for the physical layer signaling, for example, the PUCCH, which is typically limited in a system.

Since, the feedback and control information is not transported frequently, more data may be transported at each instance of higher layer signaling without using or sacrificing substantial network capacity or bandwidth. For instance, larger and more accurate channel estimation or preceding matrices may be forwarded, which may enhance the performance of the close-loop MIMO scheme on the relay link. In an embodiment, instead of forwarding PMI or CQI index tables with limited bit size, larger tables may be sent to reference more values. In some embodiments, the PMI or CQI values or preceding weight values may be sent directly, for instance in a floating point format.

For instance, when the access node 106 receives higher layer signaling, such as RRC signaling including a floating point format precoding weight value, the higher layer (e.g. RRC) may forward the preceding weight values to the physical layer. Hence, the physical layer may directly apply the precoding weight values for MIMO transmissions without any table look-up procedures. Currently, the access node 106 receives a plurality of preceding indices, which may be a small set of indices, via the physical layer signaling. The access node 106 uses the preceding indices to obtain the preceding weight values for MIMO transmissions from a pre-defined table stored in the access node 106 or somewhere in the network. This current approach reduces the signaling overhead but degrades the accuracy of the signaling information.

In some embodiments, the downlink or uplink data over the relay link may be modulated at higher rates in comparison to lower order modulation to improve transmission efficiency. For instance, the downlink or uplink data over the relay link may be modulated using 256 quadrature amplitude modulation (QAM) or higher order modulations instead of using 64 QAM.

In an embodiment, the access node 106 may forward some MIMO configuration information or other network configuration information to the relay node 102, via the relay link 104, or to the UA 110 via the direct link 112. Specifically, the access node 106 may establish a downlink with the relay node 102 or the UA 110 using higher layer signaling. As such, the configuration information may be transported upon demand, with increased accuracy, and without allocating additional resources for the PDCCH.

In an embodiment, the UA 110 may forward uplink data to the relay node 102 via the access link 108. Typically, the distance between the UA 110 and the relay node 102 may be less than the distance between the relay node 102 and the access node 106. Because of shorter distance between the UA 110 and the relay node 102, this link may have a higher signal-to-interference ratio (SINR). Further, the shorter distance may also have less path loss in comparison to the distance between the relay node 102 and the access node 106. For example, the relation between the path loss L in decibel (dB) and the distance R may be obtained using the following expression or equation:

$$L = 140.7 + 36.7 \log_{10} R.$$

According to this relation, it is clear that reducing the distance R reduces the path loss L. For example, if the distance between the UA 110 and the relay node 102 is ten times smaller than the distance between the relay node 102 and the access node 106, the path loss associated with the access link 108 may be about 36.7 dB less than the path loss associated with the relay link 104. Hence, the transmission power for the access link 108 may also be smaller by about 36.7 dB than the transmission power required for the relay link 104 to receive the corresponding signals at about equal strength. The lower transmission power for the access link 108 may save more battery power at the UA 110.

The higher SINR and lower path loss associated with the access link 108 may be suitable for using an OFDMA scheme to establish the uplink between the UA 110 and the relay node 102 and transmit the uplink data. In this case, the uplink resource may also be established using lower layer signaling, such layer 1 signaling. Using the OFDMA, a subset of subcarriers or resources may be allocated to the UA 110. The subset of subcarriers may comprise discontinuous resources, continuous resources, or combinations thereof, which may improve resource utilization and network efficiency. The UA 110 may obtain the allocated resources or the subset of subcarriers over the PDCCH from the relay node 102 or the access node 106. For instance, the PDCCH may comprise an uplink grant that includes the allocated resources. In some embodiments, a similar OFDMA scheme may be used to establish an uplink on the direct link between the UA 110 and the access node 106 and transmit uplink data.

In an embodiment, the uplink grant may be forwarded in the form of a bitmap of the allocated resources. For instance, the bitmap may comprise a plurality of bits that may be set to indicate a plurality of assigned RBs, which may be discontinuous. Alternatively, the bits may be set to indicate a plurality of assigned subsets of RBs or lists of RBs, which may each comprise a plurality of continuous RBs. In some embodiments, the UA 110 may receive a plurality of bitmaps that indicate individual RBs as well as lists of continuous RBs.

In another embodiment, a plurality of continuous subsets of assigned resources or RBs may be transported over the PDCCH by signaling the first and last RB for each subset. In yet another embodiment, the assigned RBs may be forwarded over the PDCCH using a DCI format, such as a DCI format 1, 1A, 2, or 2A, as specified in the 3GPP TS 36.212.

Figure 2:
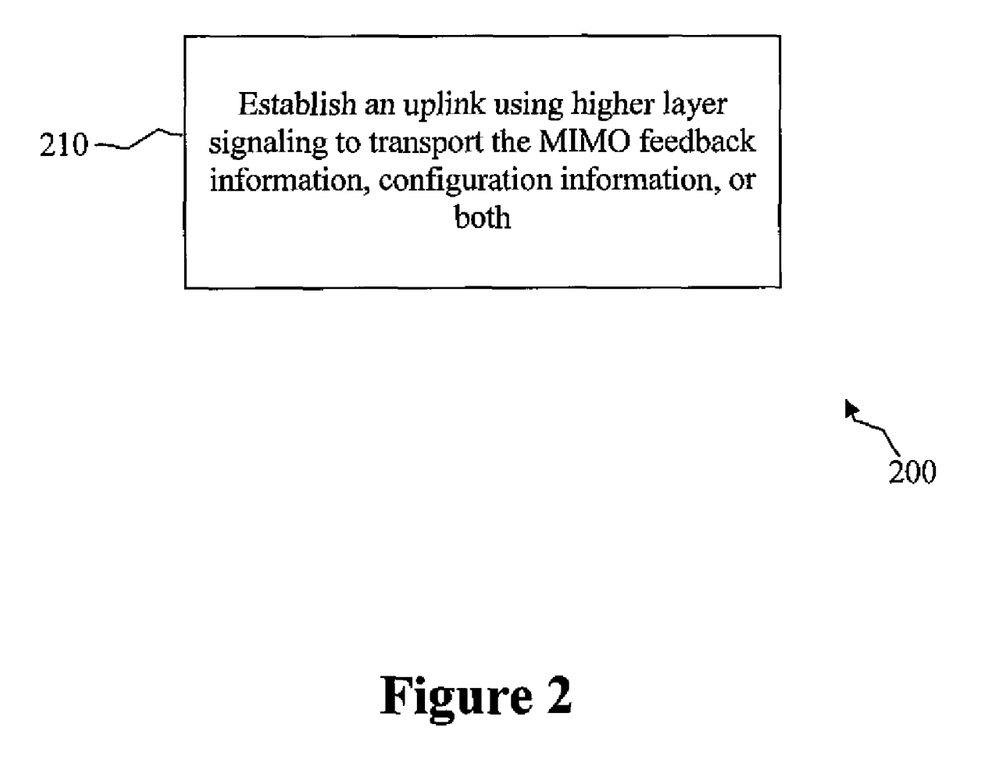
FIG. 2 is a block diagram of a method for establishing an uplink relay link according to an embodiment of the disclosure.

FIG. 2 illustrates an embodiment of a method 200 for establishing an uplink relay link in the wireless communication system 100 to provide the MIMO feedback and configuration information. In block 210, the relay node 102 may establish an uplink with the access node 106 using higher layer signaling. The uplink may be used to transport the MIMO feedback information, configuration information, or both from the relay node 102 to the access node 106. For instance, the relay node 102 may signal the access node 106 using the RRC protocol to provide the MIMO feedback and/or configuration information. The MIMO feedback and/or configuration information may be provided when necessary in a periodic manner or upon request from the access node 106. Accordingly, the values or precoding values of the feedback and/or configuration information may be provided over the uplink.

Figure 3:
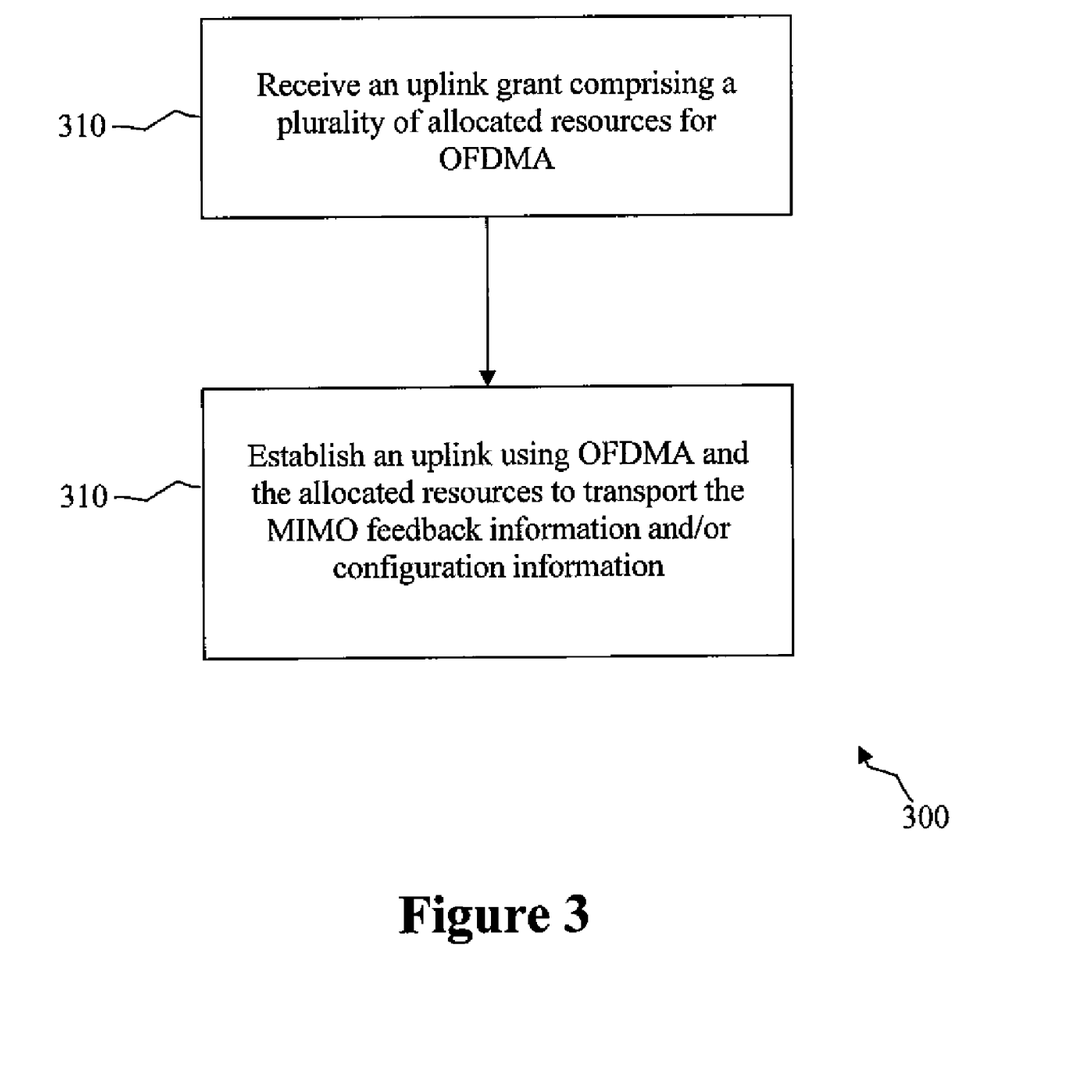
FIG. 3 is a block diagram of a method for establishing an uplink access link according to an embodiment of the disclosure.

FIG. 3 illustrates an embodiment of a method 300 for establishing an uplink access link in the wireless communication system 100 to forward the uplink data. In block 310, the UA 110 may receive an uplink grant including a plurality of allocated subcarriers or resources for OFDMA. For instance, the UA 110 may receive the uplink grant over a PDCCH from the relay node 102 or the access node 106. For instance, the uplink may include at least one bitmap comprising the allocated individual RBs, lists of continuous RBs, or both. Alternatively, the uplink may comprise a DCI format 1, 1A, 2, or 2A that indicates the allocated resources. In block 320, the UA 110 may establish an uplink with the relay node 102 using OFDMA and the allocated resources. The uplink may be used to transport the uplink data from the UA 110 to the relay node 102. For instance, the UA 102 may send communications data to the relay node 102 using layer 1 signaling and the subcarriers or resources allocated to the UA 110.

Figure 4:
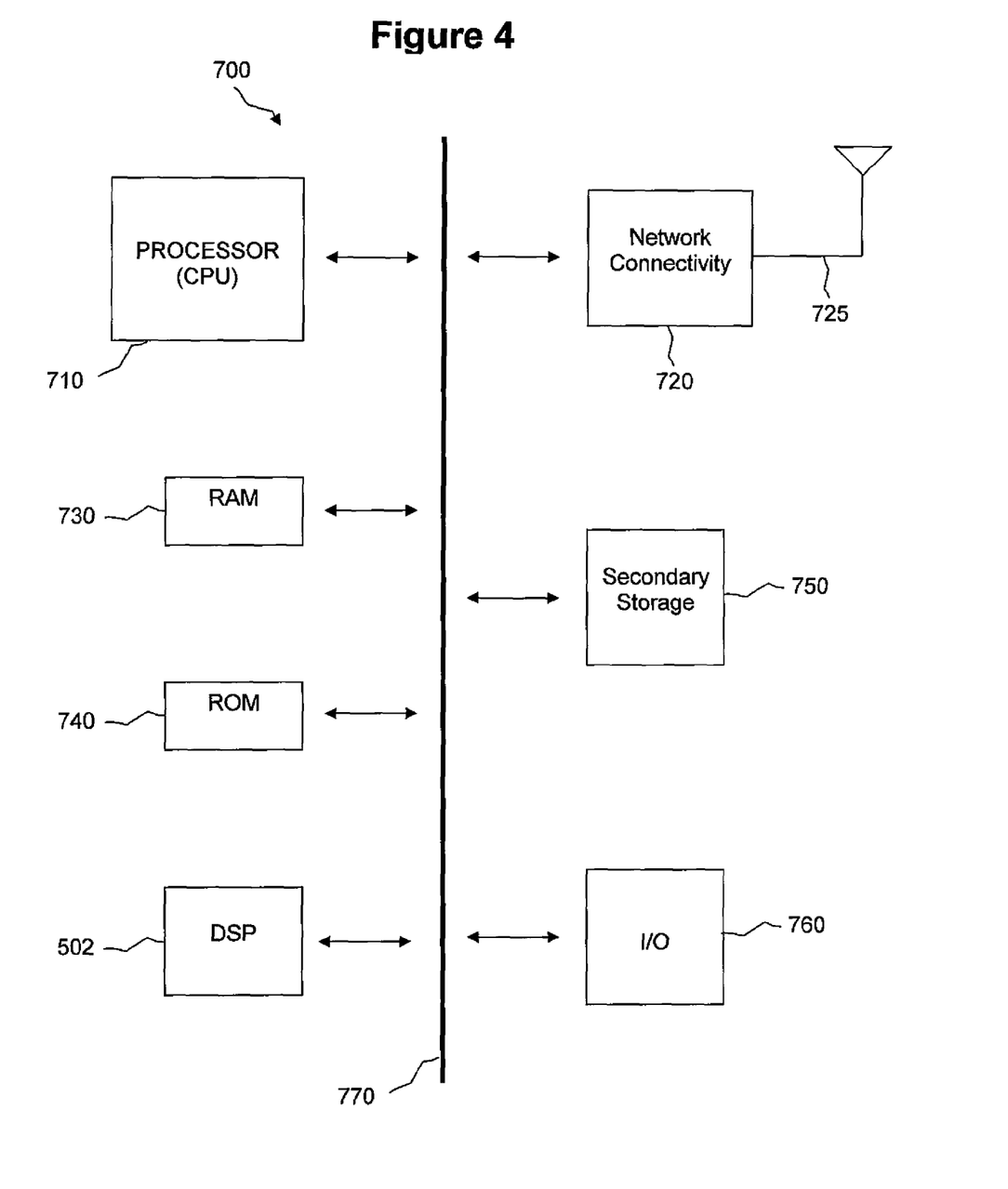
FIG. 4 illustrates a processor and related components suitable for implementing the several embodiments of the present disclosure.

The UA 110 and other components described above might include a processing component that is capable of executing instructions related to the actions described above. FIG. 4 illustrates an example of a system 700 that includes a processing component 710 suitable for implementing one or more embodiments disclosed herein. In addition to the processor 710 (which may be referred to as a central processor unit or CPU), the system 700 might include network connectivity devices 720, random access memory (RAM) 730, read only memory (ROM) 740, secondary storage 750, and input/output (I/O) devices 760. These components might communicate with one another via a bus 770. In some cases, some of these components may not be present or may be combined in various combinations with one another or with other components not shown. These components might be located in a single physical entity or in more than one physical entity. Any actions described herein as being taken by the processor 710 might be taken by the processor 710 alone or by the processor 710 in conjunction with one or more components shown or not shown in the drawing, such as a DSP 502. Although the DSP 502 is shown as a separate component, the DSP 502 might be incorporated into the processor 710.

The processor 710 executes instructions, codes, computer programs, or scripts that it might access from the network connectivity devices 720, RAM 730, ROM 740, or secondary storage 750 (which might include various disk-based systems such as hard disk, floppy disk, or optical disk). While only one CPU 710 is shown, multiple processors may be present. Thus, while instructions may be discussed as being executed by a processor, the instructions may be executed simultaneously, serially, or otherwise by one or multiple processors. The processor 710 may be implemented as one or more CPU chips.

The network connectivity devices 720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 720 may enable the processor 710 to communicate with the Internet or one or more telecommunications networks or other networks from which the processor 710 might receive information or to which the processor 710 might output information. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that typically has a smaller memory capacity than the memory capacity of the secondary storage 750. ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 725 might be considered to be a component of the I/O devices 760 instead of or in addition to being a component of the network connectivity devices 720. Some or all of the I/O devices 760 may be substantially similar to various components depicted in the previously described drawing of the UA 110, such as the display 402 and the input 404.

The following are incorporated herein by reference for all purposes: 3GPP TS 36.212, 3βPP TS 36.304, and 3GPP TS 36.331.

In an embodiment, a method is provided for providing MIMO feedback information and configuration information. The method includes transporting the feedback information, configuration information, or both over an uplink relay link using higher layer signaling.

In an embodiment, the method for providing MIMO feedback information and configuration information further comprising using higher order modulation to transmit the feedback information, configuration information, or both over the uplink relay link.

In an embodiment, the method for providing MIMO feedback information and configuration information, wherein the feedback information, configuration information, or both is transmitted over the uplink relay link using 256 QAM or higher modulation orders.

In another embodiment, a method is provided for providing uplink data transmission over an access link. The method includes transporting the uplink data over an uplink access link using OFDMA.

In another embodiment, a relay node is provided. The relay node includes a processor configured to promote transmitting MIMO feedback information, configuration information, or both over an uplink relay link using higher layer signaling.

In another embodiment, a UA is provided. The UA includes a processor configured to promote transmitting uplink data over an uplink access link using OFDMA.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A method in a relay node, comprising:
establishing an access link between the relay node and a user agent, the access link based on a first feedback loop that relies on layer 1 signaling of access link feedback information regarding the access link; and
establishing a relay link between the relay node and an access node, the relay link based on a second feedback loop that relies on higher layer signaling of relay link feedback information regarding the relay link, the higher layer signaling being higher than layer 1 signaling, wherein the relay link feedback information is transported less frequently via the relay link as compared to the access link feedback information used on the access link.

2. The method of claim 1, further comprising:
using higher order modulation to transmit the relay link feedback information over the relay link, the higher order modulation being higher than 64 quadrature amplitude modulation (QAM).

3. The method of claim 1, wherein the relay link feedback information comprises a precoding matrix indicator (PMI), a rank indication (RI), a channel quality indicator (CQI), or combinations thereof.

4. The method of claim 1, wherein the higher layer signaling is a radio resource control (RRC) protocol signaling.

5. The method of claim 1, wherein the relay link feedback information, is transported in a periodic manner or upon demand.

6. The method of claim 1, wherein the relay link feedback information comprises a plurality of values or precoding values associated with a precoding matrix indicator (PMI) or channel quality indicator (CQI).

7. The method of claim 1 further comprising:
transporting MIMO configuration information over a downlink relay link using higher layer signaling.

8. The method of claim 1, wherein the access link includes a first multiple-input multiple-output (MIMO) connection, the first MIMO connection being based on the first feedback loop.

9. The method of claim 8, wherein the relay link includes a second MIMO connection, the second MIMO connection being based on the second feedback loop.

10. A method in a relay node, comprising:
establishing an access link between the relay node and a user agent, the access link based on a first feedback loop that relies on layer 1 signaling of access link feedback information regarding the access link; and
establishing a relay link between the relay node and an access node, the relay link based on a second feedback loop that relies on higher layer signaling of relay link feedback information regarding the relay link, the higher layer signaling being higher than layer 1 signaling,
wherein the relay link feedback information is transported using the higher layer signaling, and comprises more accurate channel estimation values or larger precoding matrices as compared to the access link feedback information that is transported using the layer 1 signaling.

11. A method in a relay node, comprising:
establishing an access link between the relay node and a user agent, the access link based on a first feedback loop that relies on layer 1 signaling of access link feedback information regarding the access link; and
establishing a relay link between the relay node and an access node, the relay link based on a second feedback loop that relies on higher layer signaling of relay link feedback information regarding the relay link, the higher layer signaling being higher than layer 1 signaling,
wherein the relay link feedback information is transported using the higher layer signaling, and comprises at least one index table that references more values associated with a precoding matrix indicator (PMI) or channel quality indicator (CQI) as compared to the access link feedback information that is transported using the layer 1 signaling.

12. A relay node comprising:
a processor configured to promote establishing an access link between the relay node and a user agent, the access link based on a first feedback loop that relies on layer 1 signaling of access link feedback information regarding the access link,
wherein the processor is further configured to promote establishing a relay link between the relay node and an access node, the relay link based on a second closed-feedback loop that relies on higher layer signaling of relay link feedback information regarding the relay link, the higher layer signaling being higher than layer 1 signaling,
wherein the relay link feedback information is transported less frequently via the relay link as compared to the access link feedback information used on the access link.

13. The relay node of claim 12, further comprising:
using higher order modulation to transmit data over the relay link, the higher order modulation being higher than 64 quadrature amplitude modulation (QAM).

14. The relay node of claim 12, wherein the relay link feedback information comprises a precoding matrix indicator (PMI), a rank indication (RI), a channel quality indicator (CQI), or combinations thereof.

15. The relay node of claim 12, wherein the higher layer signaling is a radio resource control (RRC) protocol signaling.

16. The relay node of claim 12, wherein the relay link feedback information is transported in a periodic manner or upon demand.

17. The relay node of claim 12, wherein the relay link feedback information comprises a plurality of values or precoding values associated with a precoding matrix indicator (PMI) or channel quality indicator (CQI).

18. The relay node of claim 12, wherein the processor is further configured to obtain MIMO configuration information over a downlink relay link using higher layer signaling.

19. The relay node of claim 12, wherein the access link includes a first multiple-input multiple-output (MIMO) connection, the first MIMO connection being based on the first feedback loop.

20. The relay node of claim 19, wherein the relay link includes a second MIMO connection, the second MIMO connection being based on the second feedback loop.

21. A relay node comprising:
a processor configured to promote establishing an access link between the relay node and a user agent, the access link based on a first feedback loop that relies on layer 1 signaling of access link feedback information regarding the access link,
wherein the processor is further configured to promote establishing a relay link between the relay node and an access node, the relay link based on a second feedback loop that relies on higher layer signaling of relay link feedback information regarding the relay link, the higher layer signaling being higher than layer 1 signaling,
wherein the relay link feedback information is transported using the higher layer signaling, and comprises more accurate channel estimation or larger precoding matrices as compared to the access link feedback information that is transported using the layer 1 signaling.

22. A relay node comprising:
a processor configured to promote establishing an access link between the relay node and a user agent, the access link based on a first feedback loop that relies on layer 1 signaling of access link feedback information regarding the access link,
wherein the processor is further configured to promote establishing a relay link between the relay node and an access node, the relay link based on a second feedback loop that relies on higher layer signaling of relay link feedback information regarding the relay link, the higher layer signaling being higher than layer 1 signaling, wherein the relay link feedback information is transported using the higher layer signaling, and comprises at least one index table that references more values associated with a precoding matrix indicator (PMI) or channel quality indicator (CQI) as compared to the access link feedback information that is transported using the layer 1 signaling.

* * * * *